United States Patent
Anex

(10) Patent No.: US 12,496,689 B2
(45) Date of Patent: *Dec. 16, 2025

(54) TOOL FOR INSTALLATION AND REMOVAL OF RETENTION KNOBS

(71) Applicant: George R Anex, Ollala, WA (US)

(72) Inventor: George R Anex, Ollala, WA (US)

( * ) Notice: Subject to any disclaimer, the term of this patent is extended or adjusted under 35 U.S.C. 154(b) by 627 days.

This patent is subject to a terminal disclaimer.

(21) Appl. No.: 17/570,905

(22) Filed: Jan. 7, 2022

(65) Prior Publication Data
US 2022/0143787 A1    May 12, 2022

Related U.S. Application Data

(63) Continuation of application No. 16/433,812, filed on Jun. 6, 2019, now Pat. No. 11,219,987.

(51) Int. Cl.
| | |
|---|---|
| *B25B 23/00* | (2006.01) |
| *B23B 31/06* | (2006.01) |
| *B25B 13/50* | (2006.01) |
| *B25B 27/14* | (2006.01) |
| *B23P 6/00* | (2006.01) |

(52) U.S. Cl.
CPC .......... *B25B 23/0035* (2013.01); *B23B 31/06* (2013.01); *B25B 13/50* (2013.01); *B25B 27/14* (2013.01); *B23B 2231/0296* (2013.01); *B23P 6/00* (2013.01); *Y10T 29/49822* (2015.01)

(58) Field of Classification Search
CPC ..... B25B 13/50; B25B 23/0035; B25B 27/14; B23B 31/06; B23B 31/1071; B23B 2231/0296

See application file for complete search history.

(56) References Cited

U.S. PATENT DOCUMENTS 5,846,037 A * 12/1998 Boisvert ............... B23B 31/008
                                                408/239 A
5,885,039 A *  3/1999 Boisvert ............... B23B 31/008
                                                409/234
5,926,931 A *  7/1999 Collins ................... B25B 13/48
                                                81/124.3

(Continued)

FOREIGN PATENT DOCUMENTS

| CN | 109605262 A | * | 4/2019 | ............. B25B 21/02 |
| DE | 10358223 B3 | * | 4/2005 | ......... B23B 31/1072 |
| DE | 202009011087 U1 | * | 4/2010 | ......... B25B 23/0035 |

*Primary Examiner* — Eric A. Gates
(74) *Attorney, Agent, or Firm* — Larsen IP PLLC; James C. Larsen

(57) ABSTRACT

A retention knob tool. A tubular body is held in a tubular sleeve, and symmetrically formed around an axis. The tubular body also has an internal bore. Four locking ball retainer sockets are formed in the tubular body. A retention knob aperture is recessed within a top plate. Four balls are movably held in the ball retainer sockets. A tubular end stop is affixed to the tubular body rearward end. A drive tool cavity is recessed within the tubular body rearward end. The sleeve forward end includes a recessed circumferential portion bounded by a first thicker portion of the inside wall, where the first thicker portion bears against the balls when the tubular body is translated rearwardly not an inward lock position and the inward force is removed from the plurality of balls when the tubular body is extended forwardly into a released position.

13 Claims, 5 Drawing Sheets

(56) References Cited

U.S. PATENT DOCUMENTS

| | | | |
|---|---|---|---|
| 6,360,634 B1 * | 3/2002 | Leitch | B25B 23/101 |
| | | | 81/125 |
| 8,366,120 B2 * | 2/2013 | Hu | B25B 23/12 |
| | | | 279/66 |
| 11,219,987 B2 * | 1/2022 | Anex | B25B 13/50 |

* cited by examiner

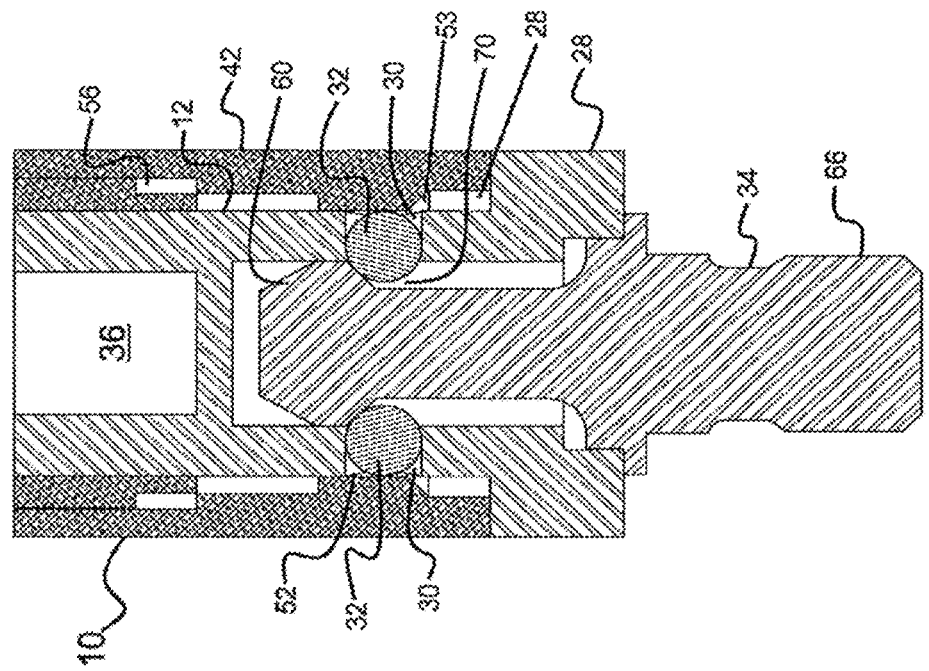
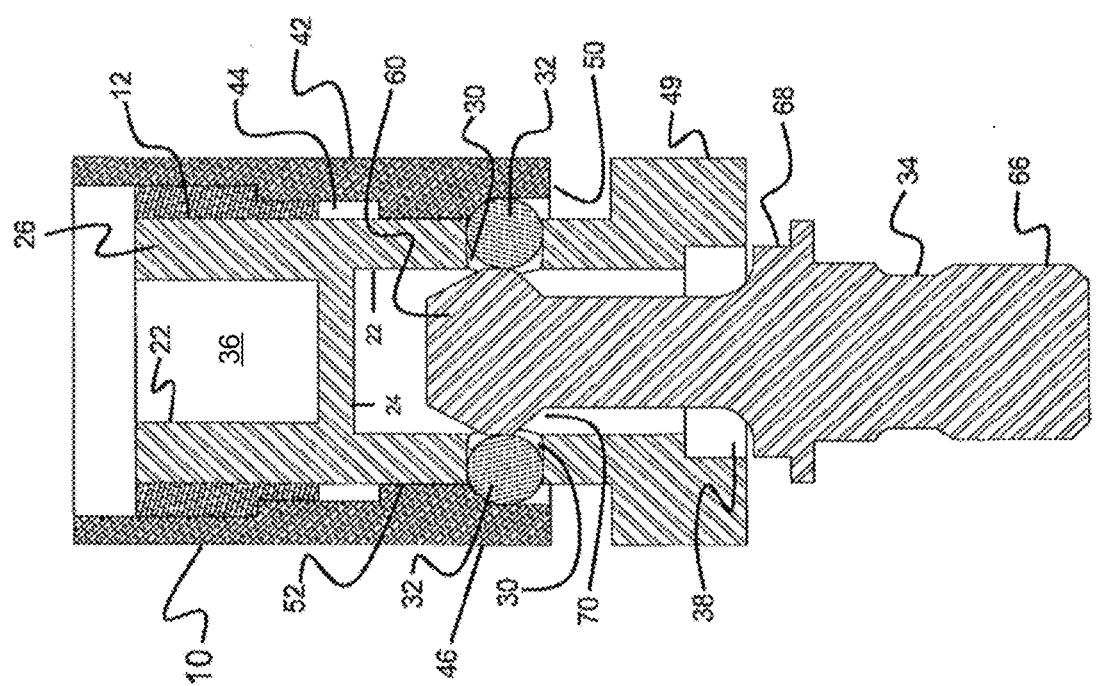
FIG. 2A
FIG. 2B

TOOL FOR INSTALLATION AND REMOVAL OF RETENTION KNOBS

PREVIOUS APPLICATION

This application is a continuation of patent application Ser. No. 16/433,812, filed on Jun. 6, 2019.

TECHNICAL FIELD

The present invention relates to a tool for installation and removal of retention knobs used in CNC tooling machines in general, and, more particularly, a tool for installation and removal of retention knobs having a set of balls within a dual mode socket tool arranged to capture a retention knob.

BACKGROUND OF THE INVENTION

The present disclosure provides new and novel solutions to overcome problems inherent in the art of Computer Numerical Control (CNC) machining. CNC refers to the automated control of machining tools like drills, boring tools, and lathes by a computer. Using, various types of such tools, a CNC machine alters a blank piece of material (metal, plastic, wood, ceramic, or composite) to meet precise specifications by following programmed instructions and without a manual operator. Different tools are held by a tool holder and changed by an operator as needed for various machining functions.

A small engagement facilitating device, known as a retaining knob (also sometime called a pull stud), includes a threaded shank that rotatably secures into the threaded aperture of a tool holder in a CNC machine. In addition to the threaded shank section, retaining knobs are configured to further include an enlarged diameter section, relatively thin flange section, and an elongated neck section that extends upward away from the flange to a knob section at the distal end of the retaining knob. Parallel wrenching flats are milled or otherwise formed at diametrically opposite sides of the flange section.

Typically, a CNC machine includes an engagement tip which securely grips the knob section, elongated neck, and flange sections of a retaining knob in order to mount to a tool holder. Due to the high amount of torque that is transmitted through a retaining knob from the spindle of a CNC machine, to the tool holder and attached tool, the threaded shank section of a retaining knob must be rotatably secured in the threaded aperture of the tool holder at a high degree of torque (on the order of 85 ft. lbs.). This torque is applied to the retaining knob at the relatively thin wrenching flats of the flange section of a retaining knob. Substantially, the entire remainder of the retaining knobs outer surface is circular in configuration. Thus, the relatively thin wrenching flats provide the only obvious gripping surface for use in creating a rotational force to remove and install a retaining knob from a tool holder.

Often an open-ended wrench is used for removal of a retaining knob. However, this has the disadvantage of rounding the flat surfaces of the retaining knob over time causing damage to the retaining knob and shortening its useful life. Another disadvantage is that use of a wrench can cause injury to an operator since the wrench can easily slip off of the wrenching flats. Further, use of a crescent wrench or the like, requires a two-step operation of loosening the retaining, knob with the wrench, followed by actual removal of the retaining knob using an operator's fingers to prevent the knob from falling.

One type of a pull stud removal device was disclosed in U.S. Pat. No. 6,360,634B1 issued Mar. 26, 2002 to Leitch. Unfortunately, this device was rather cumbersome to use as it required attaching and removing the device on to and from a retaining knob using a sideways motion requiring a precise alignment of the tool to the retaining knob.

Thus there is a continuing need in the art for a tool that can securely attach and facilitate removal of a retaining knob from a CNC tool holder, while limiting damage to the retaining knob.

BRIEF SUMMARY OF THE DISCLOSURE this summary is provided to introduce a selection of concepts in a simplified form that are further described below in the Detailed Description. This summary is not intended to identify key features of the claimed subject matter.

A tool for installation and removal of retention knobs is provided including a tubular sleeve with an inside tubular wall, a sleeve forward end and a sleeve rearward end. A tubular body, is slidingly held in the tubular sleeve, the tubular body being symmetrically formed around an axis and including a forward end and a rearward end. The tubular body also has an internal bore bounded by an internal tubular wall surface and a rearward wall, and an external tubular body surface, wherein the forward end is joined with a top plate having a larger diameter than the tubular body surface. At least two locking ball retainer sockets are formed in the tubular body at the forward end rearwardly from the top plate. The retainer sockets are substantially normal to the axis and located radially uniformly around the tubular body. A retention knob aperture is recessed within the top plate. A plurality of balls is movably held in the ball retainer sockets. A tubular end stop is affixed to the tubular body rearward end, where the tubular end stop is inserted into the tubular sleeve, where the tubular sleeve further includes a protruding circumferential edge sized to strike against the tubular end stop when the tubular body is translated into a release position. A drive tool cavity is recessed within the tubular body rearward end, where the drive tool cavity is sized and configured for receival of a drive tool. The sleeve forward end includes a recessed circumferential portion bounded by a first thicker portion of the inside wall, where the first thicker portion bears against the plurality of balls forcing the plurality of balls inwardly when the tubular body is translated rearwardly into an inward lock position and the inward force is removed from the plurality of balls when the tubular body is extended forwardly into a release position.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 2B schematically shows a planar cross-section of the tool of FIG. 1 in an inward lock position.

Figure 1:
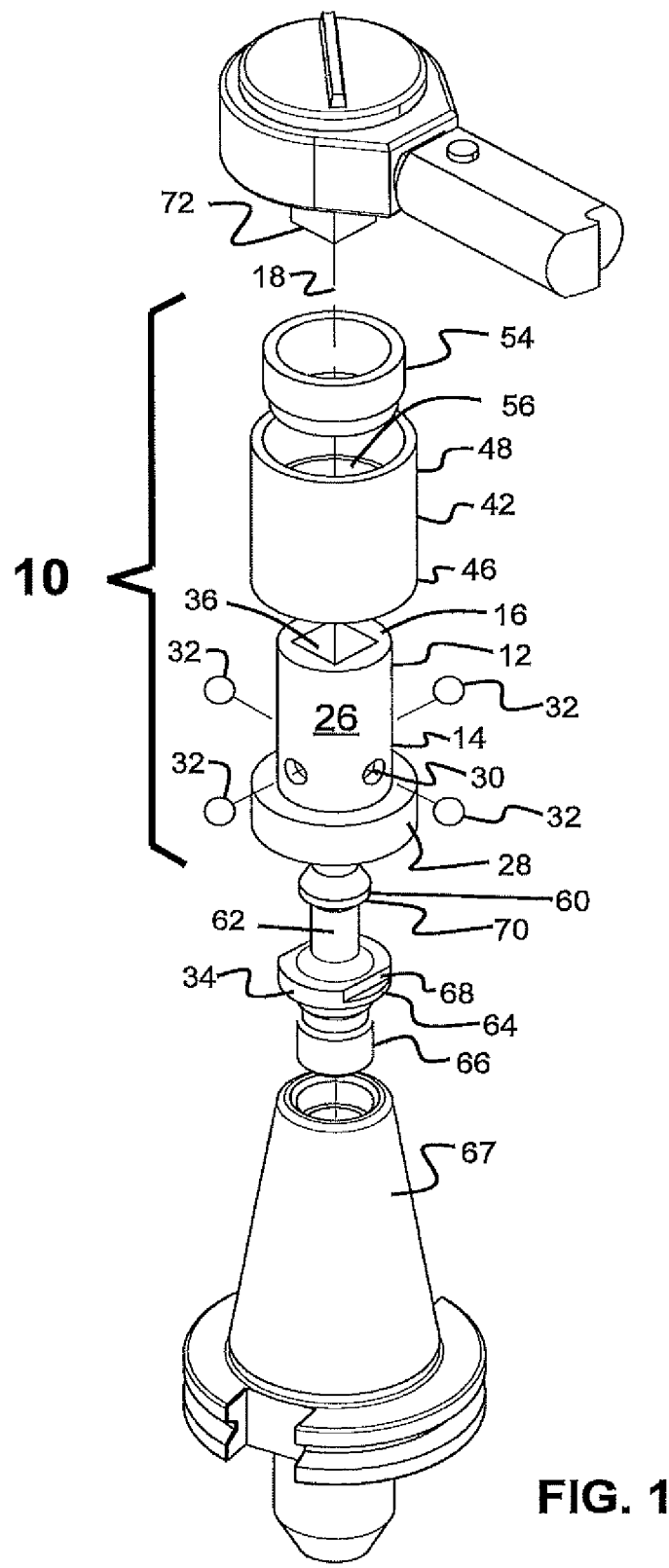
FIG. 1 schematically shows a prospective exploded view of an example of a retaining knob tool for removal and attachment of a retaining knob FIG. 2A schematically shows a planar cross-section of the tool of FIG. 1 in a release position.

In the drawings, identical reference numbers identify similar elements or components. The sizes and relative positions of elements in the drawings are not necessarily drawn to scale. For example, the shapes of various elements and angles are not drawn to scale, and some of these elements as drawn, are not intended to convey any information regarding the actual shape of the particular elements, and have been solely selected for ease of recognition in the drawings.

DETAILED DESCRIPTION OF THE PREFERRED EMBODIMENTS

The following disclosure describes several examples of a retaining knob tool used for installing and removing a CNC type retaining knob. Several features and elements in accordance with example embodiments are set forth and described in the Figures. It will be appreciated that alternatives in accordance with other example embodiments can include additional elements or features different than those shown in the Figures. Example embodiments are described herein with respect to a retaining knob tool using a mating drive socket device. However, it will be understood that these examples are for the purpose of illustrating the principles, and that the invention is not so limited. Additionally, methods and systems in accordance with several example embodiments may not include all of the features shown in the Figures.

Unless the context requires otherwise, throughout the specification and claims which follow, the word "comprise" and variations thereof, such as, "comprises" and "comprising" are to be construed in an open, inclusive sense that is as "including, but not limited to." Reference throughout this specification to "one example" or "an example embodiment", "one embodiment", "an embodiment" or various combinations of these terms means that a particular feature, structure or characteristic described in connection with the embodiment is included in at least one embodiment of the present disclosure. Thus, the appearance of the phrases "in one example" or "in an example" in various places throughout this specification are not necessarily all referring to the same example or embodiment. Furthermore, the particular features, structures, or characteristics may be combined in any suitable manner in one or more embodiments.

Referring now to FIG. 1, a prospective exploded view of an example of a retaining knob tool for removal and attachment of a retaining knob is schematically shown. A typical retention knob 34 includes a knob section 60 adjoined to an elongated neck 62 further adjoined to flange sections 64 and having a threaded shank section 66 fore threading into a CNC tool holder 67. A retention knob tool 10 for installation and removal of a retention knob 34 includes a tubular body 12 symmetrically formed around an axis 18 and including a forward end 14 and a rearward end 16. The tubular body 12 includes an internal bore 20 defined by an internal tubular wall surface 22 and a rearward wall 24, and an external tubular body surface 26, wherein the forward end 14 is joined with a top plate 28 having a larger diameter than the tubular body surface 26. At least two locking ball retainer sockets 30 are formed in the tubular body 12 at the forward end 14 below the top plate 28. The retainer sockets 30 are substantially normal to the axis 18 and located radially uniformly around the tubular body 12.

A plurality of balls 32 are sized to fit into the ball retainer sockets 30 and are moveable therein between a release position (as best shown, for example, in FIG. 2A) and an inward lock position (as best shown, for example in FIG. 2B). In one useful example, four balls may be individually inserted into one of the four sockets that are substantially uniformly positioned around the circumference of the tubular body 12. Each socket, therefore, holds a single ball. A drive tool cavity 36, is recessed within the tubular body rearward end 16. The drive tool cavity 36 is sized and configured for receiving a drive tool 72, such as a drive square of a ratchet or similar driving tool, to which the device attaches. A tubular sleeve 42 with an inside tubular wall 44 is sized to slidingly receive a portion of the tubular body between the top plate 28 and the rearward end 16, where the tubular sleeve 42 includes a sleeve forward end 46 and a sleeve rearward end 48.

In one example, the drive tool cavity 36 is substantially square and configured to mate with a ¼ inch drive socket. It will be understood, however, that the drive tool cavity 36 can also be configured to mate with a drive socket of a different size and/or shape without departing from the scope of the present invention. Preferably, at least one of the inner surfaces of the drive tool cavity 36 can include a small depression for selective engagement with a drive socket securement detent. The drive tool cavity 36 allows a drive socket to secure to the retaining knob tool 10 and significantly increases the level of torque that can be applied to a pull stud 34 for tightening and removing a pull stud 34 from a tool holder 67.

A tubular end stop 54 may advantageously be affixed to the tubular body rearward end 16, where the tubular end stop 54 is sized to fit within the tubular sleeve 42 and has a circumferential edge 56 sized to strike against a circumferential protruding edge in the tubular sleeve when the tubular body is moved into a release position as described in more detail below Referring now to FIG. 2A, a planar cross-section of the tool of FIG. 1, in a release position is schematically shown. In the release position, the retaining knob may be inserted or removed into the retaining knob tool 10. The plurality of balls 32 are each sized to individually fit into one of the ball retainer sockets 30 and are moveable therein between an inward lock position and a release position. In the release position, the retaining knob may be inserted into or removed from the retaining knob tool 10. The sleeve forward end 46 includes a recessed circumferential portion 50 encircling a first thicker portion of the inside wall 44. When the tubular body 12 is extended into the release position, the plurality of balls 32 are driven outwardly by the knob portion 60 of the retention knob 34 into the recessed circumferential portion 50.

Referring now to FIG. 2B, a planar cross-section of the tool of FIG. 1 in an inward lock position is schematically shown. In the inward lock position, the retaining knob may be inserted so that the knob portion 60 protrudes rearwardly beyond the plurality of balls 32. The top plate 28 is moved rearwardly to position the plurality of balls 32 within the first thicker portion 52 of the inside wall 44. The plurality of balls 32 are held inwardly under the tapered bottom 70 of the retainer knob portion 60 so as to hold the retainer knob 34 in place. In one example, first thicker portion 52 may include a rearwardly angled edge 53 to facilitate sliding the tubular body 12 into the tubular sleeve 42.

Figure 3:
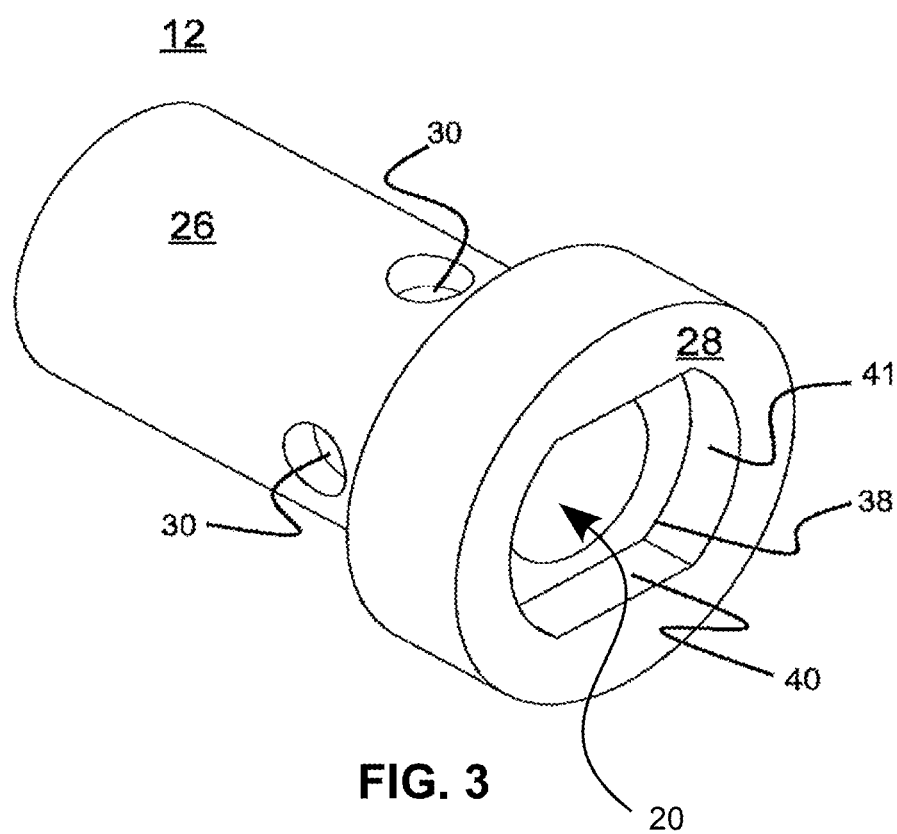
FIG. 3 schematically shows an example of a tubular body including an internal bore used in the retaining knob tool.

Referring now to FIG. 3, an example of a tubular body including an internal bore used in the retaining knob tool is schematically shown. A retention knob aperture 38 is recessed within the top plate 28. The retention knob aperture 36 may preferably be a lateral slot opening sized and configured to laterally receive and position the retention knob flange sections 64 and wrenching flats 68 in substantially the center of the top plate 28. In one example, the retention knob aperture 38 is bounded by dual parallel inner walls 40 and opposing dual curved end walls 41, where each of the dual parallel inner walls 41 spans and adjoins one end of each of the dual parallel inner walls 40. Retention knob specifications are well known in the art and available from commercial sources in the United States, for example.

Figure 4:
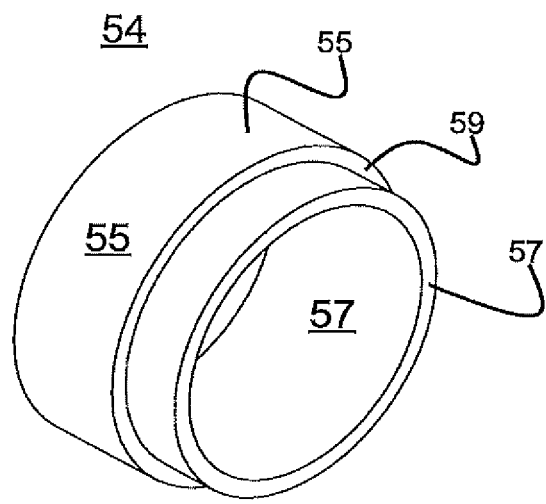
FIG. 4 schematically shows an example of a stop for limiting longitudinal travel of the tubular body.

Referring now to FIG. 4, an example of a stop for limiting longitudinal travel of the tubular body is schematically shown. The stop 54 may advantageously be a second tubular body that is shorter than the tubular sleeve 42 and sized to fit within the tubular sleeve 42. A first elongated portion 55 of the stop 54 is sized to frictionally fit within the inside tubular wall 44 where it may be affixed to the tubular body 12 by attachment means known in the art. A second, smaller circumference portion 57 of the stop 54 extends forwardly into the inside tubular wall 44 when inserted.

Figure 5:
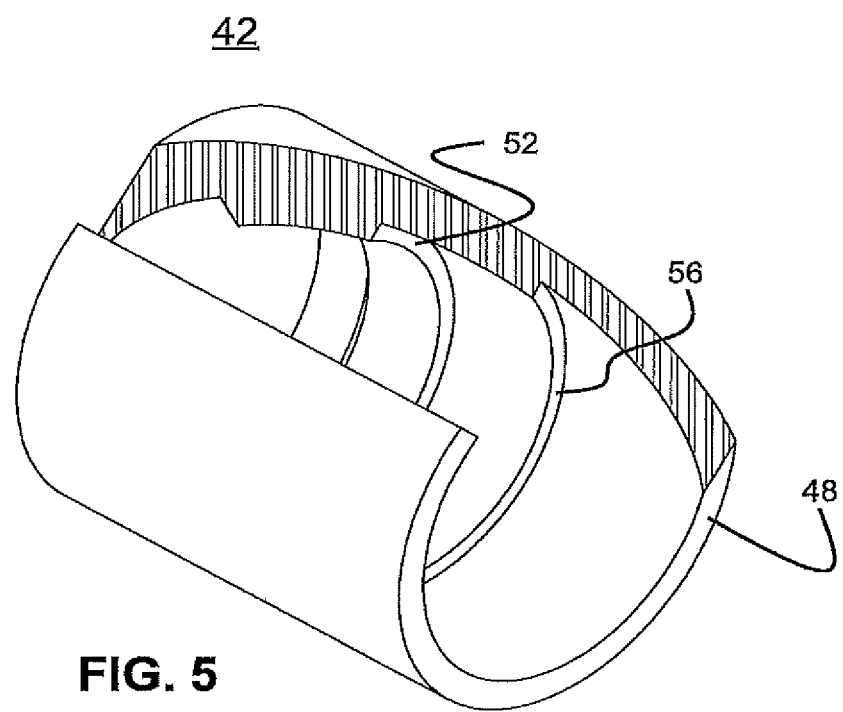
FIG. 5 schematically shows an example of a tubular sleeve as used in the retaining knob tool as seen from a sleeve rearward end.

Referring now to FIG. 5, an example of a tubular sleeve as used in the retaining knob tool as seen from a sleeve rearward end is schematically shown. The tubular sleeve has an edge 56 protruding from the inner tubular wall 44 within the sleeve rearward end 48. The edge 56 has a width and diameter adapted to meet edge 59 formed between first elongated portion 55 and the second, smaller circumference portion 57 of the stop 54.

Figure 6:
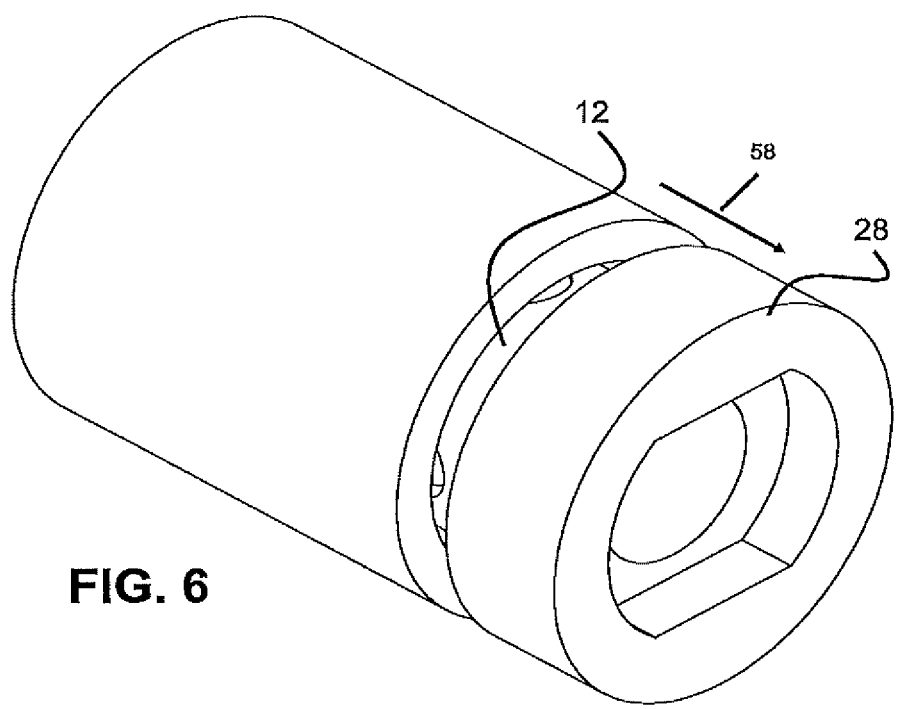
FIG. 6 shows an illustration of an assembled retaining knob tool in a retaining knob release position.

Referring now to FIG. 6, an illustration of an assembled retaining knob tool in a retaining knob release position is schematically shown. In operation, when the tubular body is moved in the forward direction indicated by directional arrow 58 with respect to tubular sleeve 42, the retaining knob tool is placed n the release position. The tubular end stop 54 prevents travel of the tubular body 12 beyond the distance where the end stop 54 meets the tubular end stop circumferential edge 56. In some examples, the retaining knob tool may be configured to be placed hi the release position or the engagement position be rotating the retaining knob tool to release or engage the retaining knob.

Figure 7:
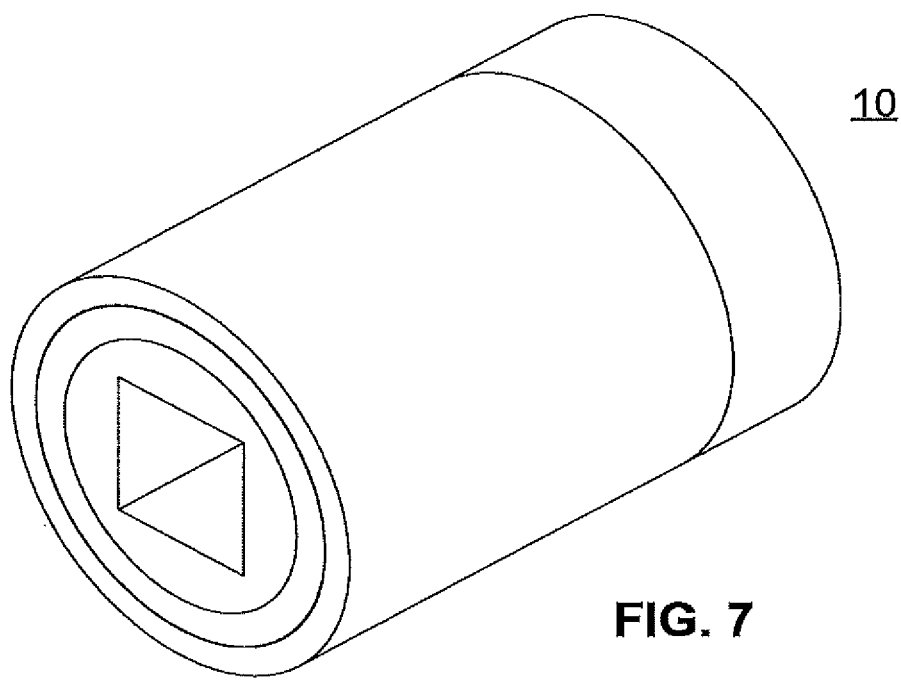
FIG. 7 show an example of an assembled retaining knob tool in a retaining knob inward lock position.

Referring now to FIG. 7, an example of an assembled retaining knob tool in a retaining knob inward lock position is schematically shown. In operation, when the tubular body is moved in the rearward direction so that the top plate meets with the forward edge 49 of tubular sleeve 42 with respect to tubular sleeve 42, the retaining knob tool is placed in the inward lock position.

Having described the elements of the tool in detail, it is now considered helpful to the understanding of the invention to explain its operation. In order to remove a retention knob from a CNC toolholder, an operator would affix a socket wrench, for example, into the drive tool cavity 36. The retaining knob tool would be positioned into the release position and inserted over the retaining knob to be removed. Once the retaining knob is fully inserted, the retaining knob tool can be positioned in the inward lock position to hold the retaining knob and engage the retaining knob wrenching flats with the retention knob aperture walls. The retaining knob is now ready to be unscrewed from the CNC toolholder by turning the socket wrench in the, for example, counterclockwise direction.

The retaining knob tool can also be used to insert a retaining know in a CNC toolholder by first inserting a loose retaining know into the retaining knob holder and putting the retaining knob holder in an inward lock position. Then using the socket wrench, as above, the retaining knob can be inserted into a CNC toolholder by turning the wrench in the, for example, clockwise direction.

The invention has been described herein considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment, and devices, and that various modifications, both as to the equipment details and operating procedures, may be accomplished without departing from the true spirit and scope of the present invention.

What is claimed is:

1. A tool for installation and removal of computer numerical control (CNC) tool retention knobs, comprising:
   an outer body member having an interior wall, the outer body member having a forward end and a rearward end;
   an inner body member, movably held in the outer body member, the inner body member having a rearward end and a forward end including a top member, the inner body member having:
   an internal bore bounded by an internal inner body member wall surface and a rearward wall,
   an external surface having a first diameter at the rearward end and a second diameter at the top member, the second diameter being larger than the first diameter, and
   at least two locking ball retainer sockets formed in the inner body member at the forward end proximate to the top member, the retainer sockets being located radially around the inner body member,
   a retention knob aperture recessed within the top member and including one or more features configured to engage an irregular wrenching structure of the CNC retention knob for applying rotational torque to the CNC retention knob,
   balls each held in a respective socket of the at least two locking ball retainer sockets and being movable therein, and
   a rotational drive tool cavity, recessed within the inner body member rearward end, the drive tool cavity being sized and configured for receiving a rotational drive tool;
   wherein the outer body member has an interior circumferential portion which is configured to bear against the balls, forcing the balls inwardly when the inner body member is moved into a locked position for the retention knobs within the outer body member, and
   wherein the inward force is removed from the balls when the inner body member is moved into a released position, allowing the retention knob to be removed.

2. The tool of claim 1, wherein the outer body member is a tubular sleeve with an interior tubular wall, a tubular sleeve forward end and a tubular sleeve rearward end, wherein the inner body member is a tubular body member and is held slidingly in the tubular sleeve, wherein the top member is a plate, and wherein the locking ball retainer sockets are located uniformly around the tubular body.

3. The tool of claim 2, including a tubular end stop affixed to the tubular body at the rearward end;

wherein the tubular end stop is inserted into the tubular sleeve, the tubular sleeve further including a protruding circumferential edge sized so as to strike against the tubular end stop when the tubular body is moved into a release position.

4. The tool of claim 2, wherein the tubular sleeve forward end includes a recessed circumferential portion bounded by a thicker portion, the thicker portion bearing against the plurality of balls, in operation forcing the plurality of balls inwardly when the tubular body is moved into a locked position, and wherein inward force is removed from the plurality of balls when the tubular body is moved into a release position.

5. The tool of claim 2, wherein the plurality of retainer sockets includes 4 locking ball retainer sockets, located substantially uniformly around the tubular body, and the balls include at least 4 balls individually inserted into the 4 locking retainer sockets.

6. The tool of claim 1, wherein the tubular end stop comprises a secondary tubular body that is shorter than the outer body member and sized to fit within the outer body member; wherein
the tubular end stop includes a first elongated portion sized to frictionally fit within the interior wall of the outer body member, and a second, smaller circumferential portion configured to extend within the circumferential ledge of the outer body member when inserted.

7. The tool of claim 1, wherein, the retention knob aperture is bounded by dual parallel inner walls and opposing dual curved end walls, where each of the dual parallel inner walls spans and adjoins one end of each of the dual parallel inner walls, the retention knob aperture configured to engage and apply rotational force, provided by the drive tool, to wrenching flats constituting the irregular wrenching structure of the CNC retention knobs.

8. A tool for installation and removal of computer numerical control (CNC) tool retention knobs, comprising:
an outer body member having an open interior;
an inner body member movably held in the outer body member, the inner body member having:
an open interior with an interior volume,
an interior surface, and
an external surface having a first diameter,
a top member at a forward end of the inner body member, the top member having a second diameter that is larger than the first diameter,
at least two locking ball retainer sockets formed in the inner body member proximate to the top member, the retainer sockets being located around the inner body member,
a retention knob aperture within the top member, the aperture extending into the interior volume of the inner body member,
balls each held in a respective socket of the locking ball retainer sockets and movable therein, and
a rotational drive tool socket at a rearward end of the inner body member, the drive tool socket being sized and configured for receiving a rotational drive tool and including one or more features configured to engage an irregular wrenching structure of the CNC retention knob for applying rotational torque to the CNC retention knob;
wherein the inner body member has first and second operational positions relative to the outer body member, wherein in the first operational position the interior surface of the inner body member forces balls in the locking ball retainer sockets inwardly, locking the retention knob in the tool, and wherein in the second operational position the balls are free to move outwardly sufficiently to allow the retention knob to be removed from the tool.

9. The tool of claim 8, wherein the outer body member is a tubular sleeve with an interior tubular wall, a tubular sleeve forward end and a tubular sleeve rearward end, wherein the inner body member is a tubular body member and is held slidingly in the tubular sleeve, wherein the top member is a plate, and wherein the locking ball retainer sockets are located uniformly around the tubular body.

10. The tool of claim 9, including a tubular end stop affixed to the tubular body at the rearward end; wherein the tubular end stop is inserted into the tubular sleeve, the tubular sleeve further including a protruding circumferential edge sized so as to strike against the tubular end stop when the tubular body is moved into a release position.

11. The tool of claim 8, wherein the plurality of retainer sockets includes 4 locking ball retainer sockets, located substantially uniformly around the tubular body, and the number of balls includes 4 balls individually located into one of the 4 locking retainer sockets.

12. The tool of claim 8, wherein the tubular end stop comprises a secondary tubular body that is shorter than the outer body member and sized to fit within the outer body member, wherein
the tubular end top includes a first elongated portion sized to frictionally fit within the interior wall of the outer body member, and a second, smaller circumferential portion configured to extend within the circumferential ledge of the outer body member when inserted.

13. The tool of claim 8, wherein the retention knob aperture recessed within the top member is bounded by dual parallel inner wall and opposing dual curved end walls, where each of the dual parallel inner walls spans and adjoins one end of each of the dual parallel inner walls, the retention knob aperture configured to engage and apply rotational force to wrenching flats of the CNC retention knobs corresponding to operation of the drive tool.

* * * * *